United States Patent [19]
Obbink et al.

[11] Patent Number: 5,767,835
[45] Date of Patent: Jun. 16, 1998

[54] METHOD AND SYSTEM FOR DISPLAYING BUTTONS THAT TRANSITION FROM AN ACTIVE STATE TO AN INACTIVE STATE

[75] Inventors: Kim Obbink, Kirkland; Bryan Ballinger, Redmond; William David Sproule, Kirkland, all of Wash.

[73] Assignee: Microsoft Corporation, Redmond, Wash.

[21] Appl. No.: 531,337

[22] Filed: Sep. 20, 1995

[51] Int. Cl.⁶ .................... G09G 5/08; G06F 3/14
[52] U.S. Cl. ............ 345/146; 345/348; 345/354; 345/977
[58] Field of Search ............... 345/122, 145, 345/146; 395/348, 354, 173, 175, 977, 978

[56] References Cited

U.S. PATENT DOCUMENTS 5,223,828  6/1993  McKiel, Jr. ............ 395/978
5,479,602  12/1995  Baecker et al. ......... 395/977
5,623,590  4/1997  Becker et al. .......... 395/977

*Primary Examiner*—Raymond J. Bayerl
*Assistant Examiner*—Matthew Luu
*Attorney, Agent, or Firm*—Jones & Askew, LLP

[57] ABSTRACT

A method and system for displaying a set of buttons on a display screen that gradually change from an active state to an inactive state. When a user selects a button displayed in its active state, such as by clicking a mouse, the system displays a sequence of transition frames at predetermined intervals, preferably 0.1 seconds. Display of the transition frames begins when a mouse down event is detected when the cursor is positioned on the button. If a mouse up event is detected when the cursor is off the button, the transition frames are displayed in reverse order until the button is displayed in its active state. When the last transition frame in the sequence is displayed, indicating that the button is in the inactive state, the function associated with the button is executed. Each transition frame may have unique audio accompaniment associated therewith. The audio associated with each transition frame may be played when the respective transition frame is drawn on the display screen.

75 Claims, 8 Drawing Sheets

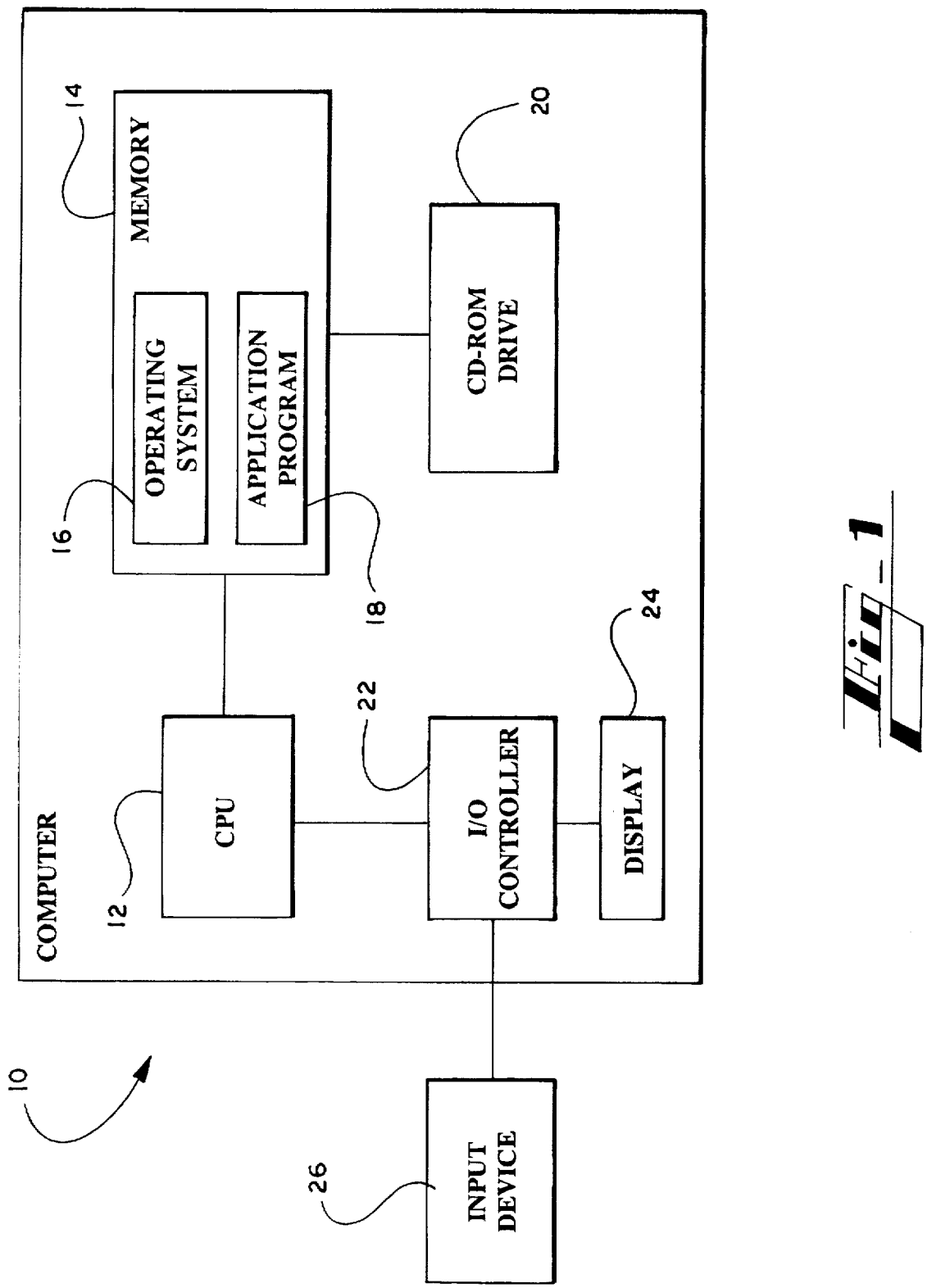

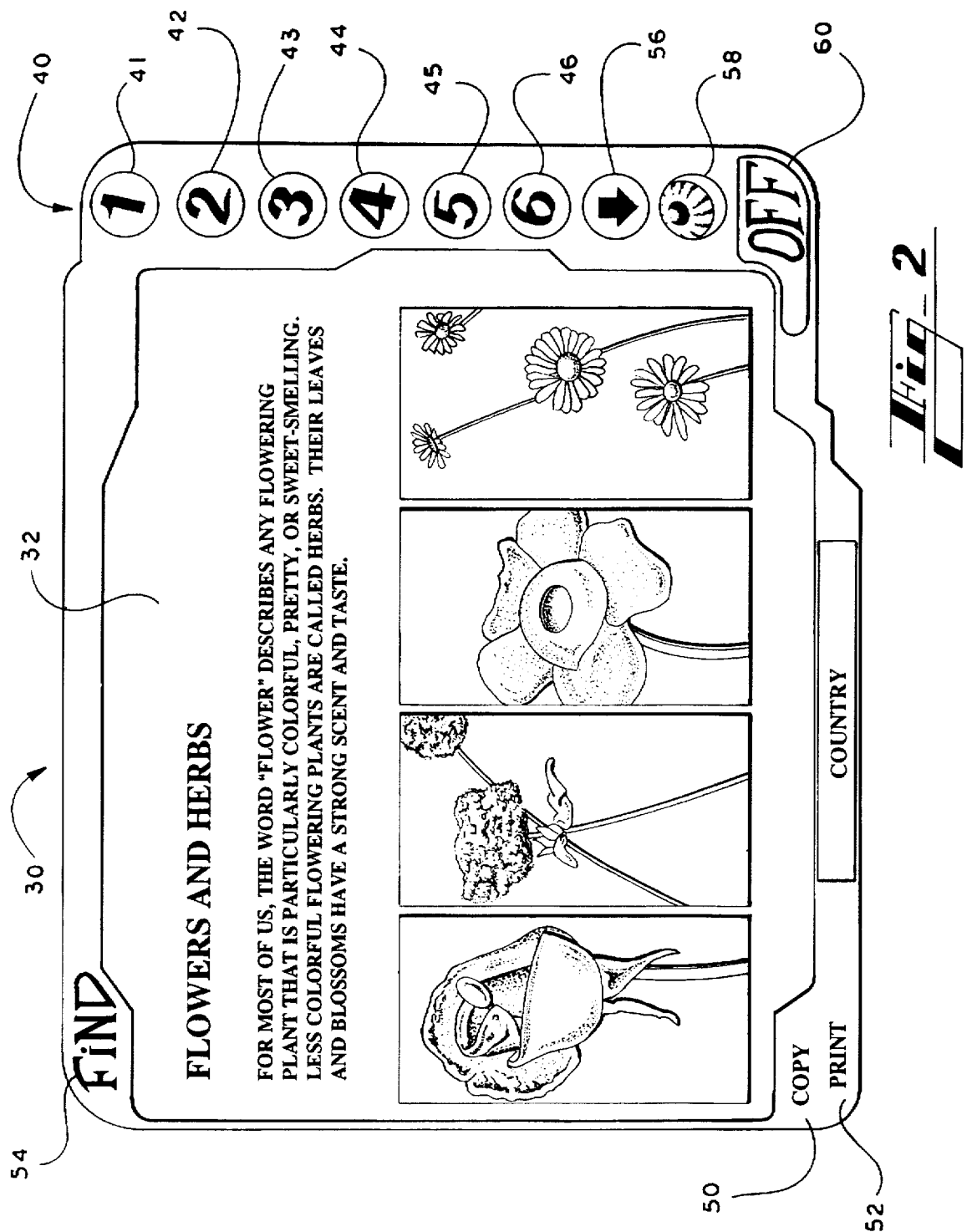

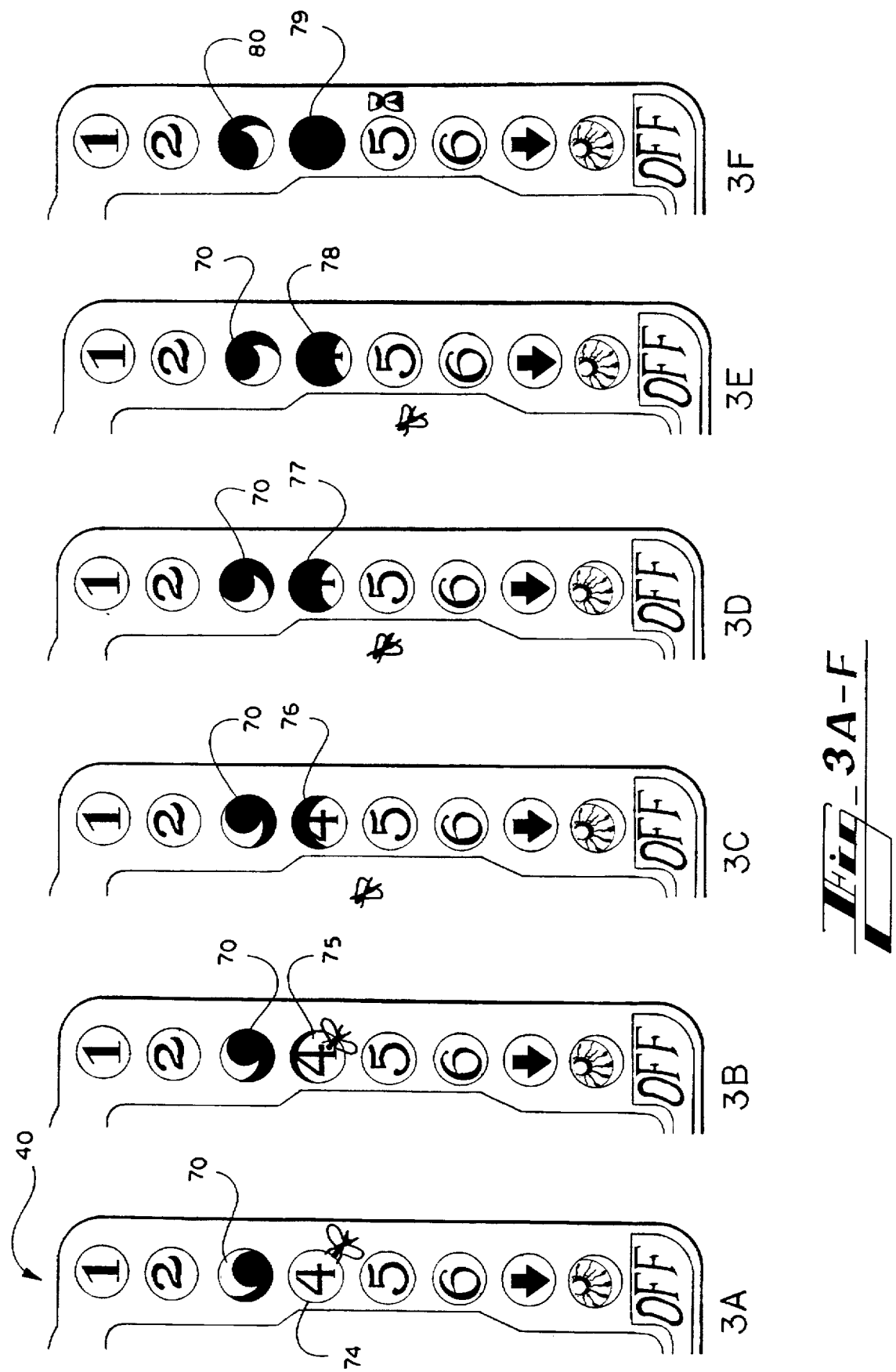
Fig_3A-F

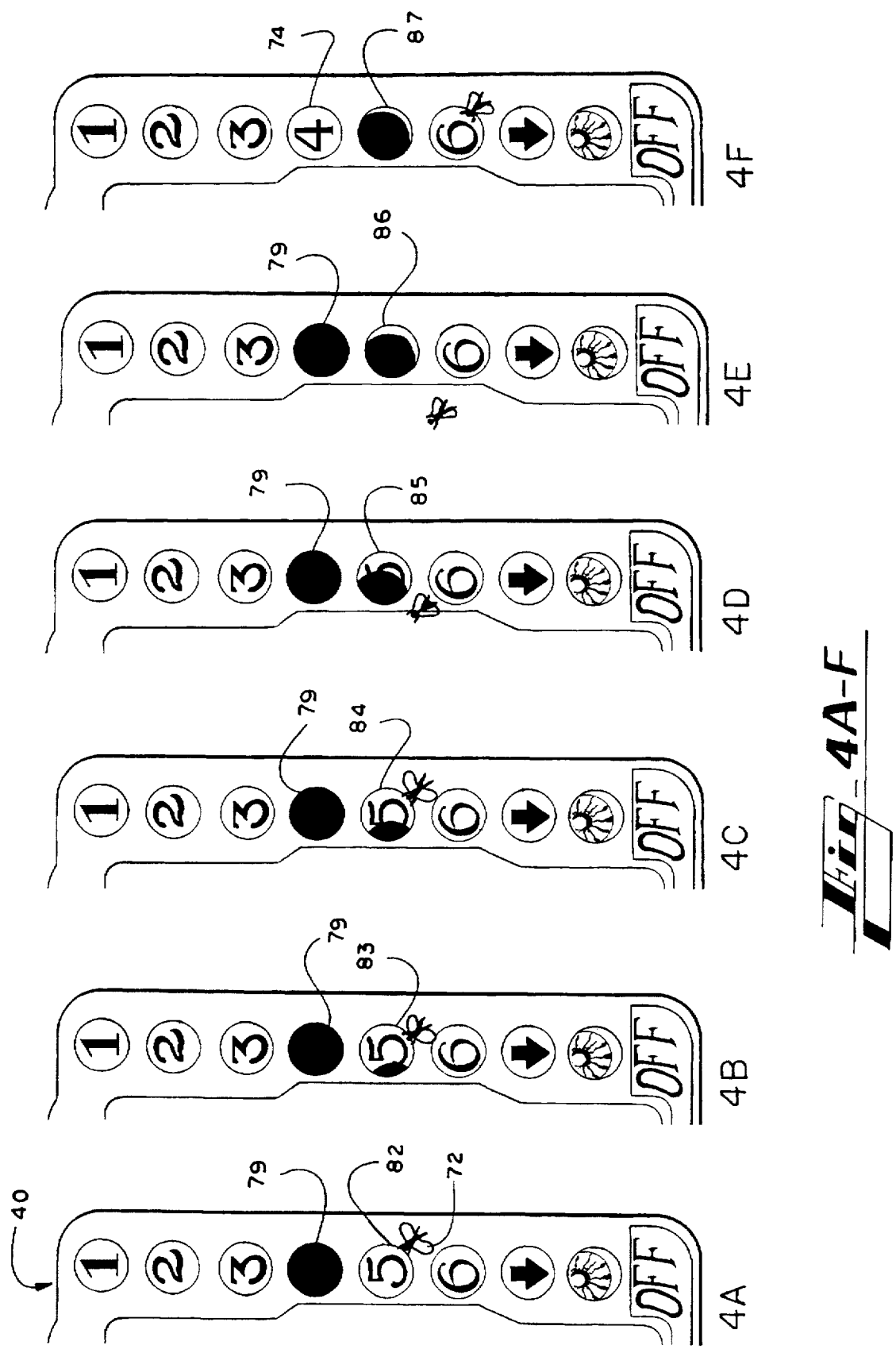

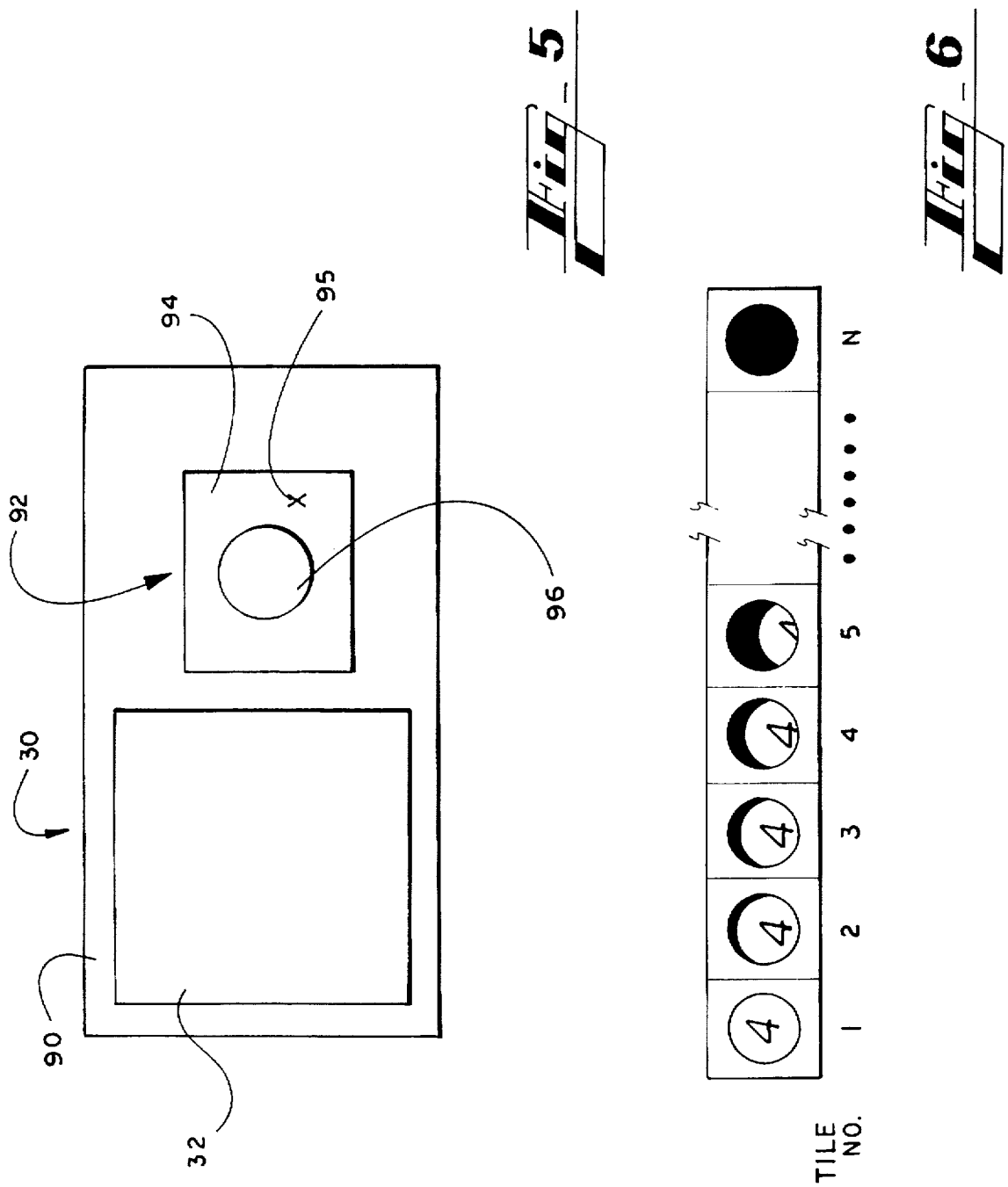

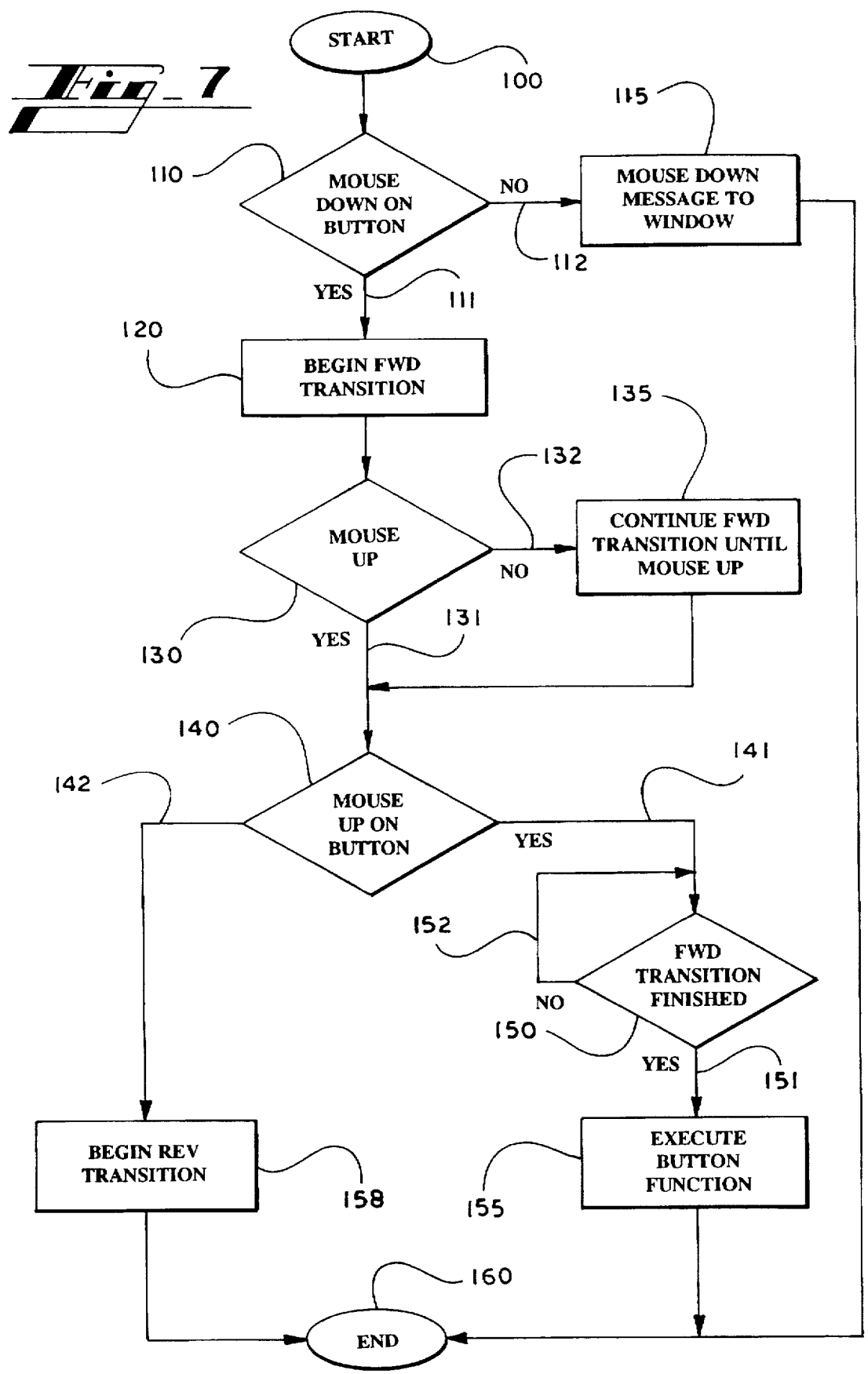

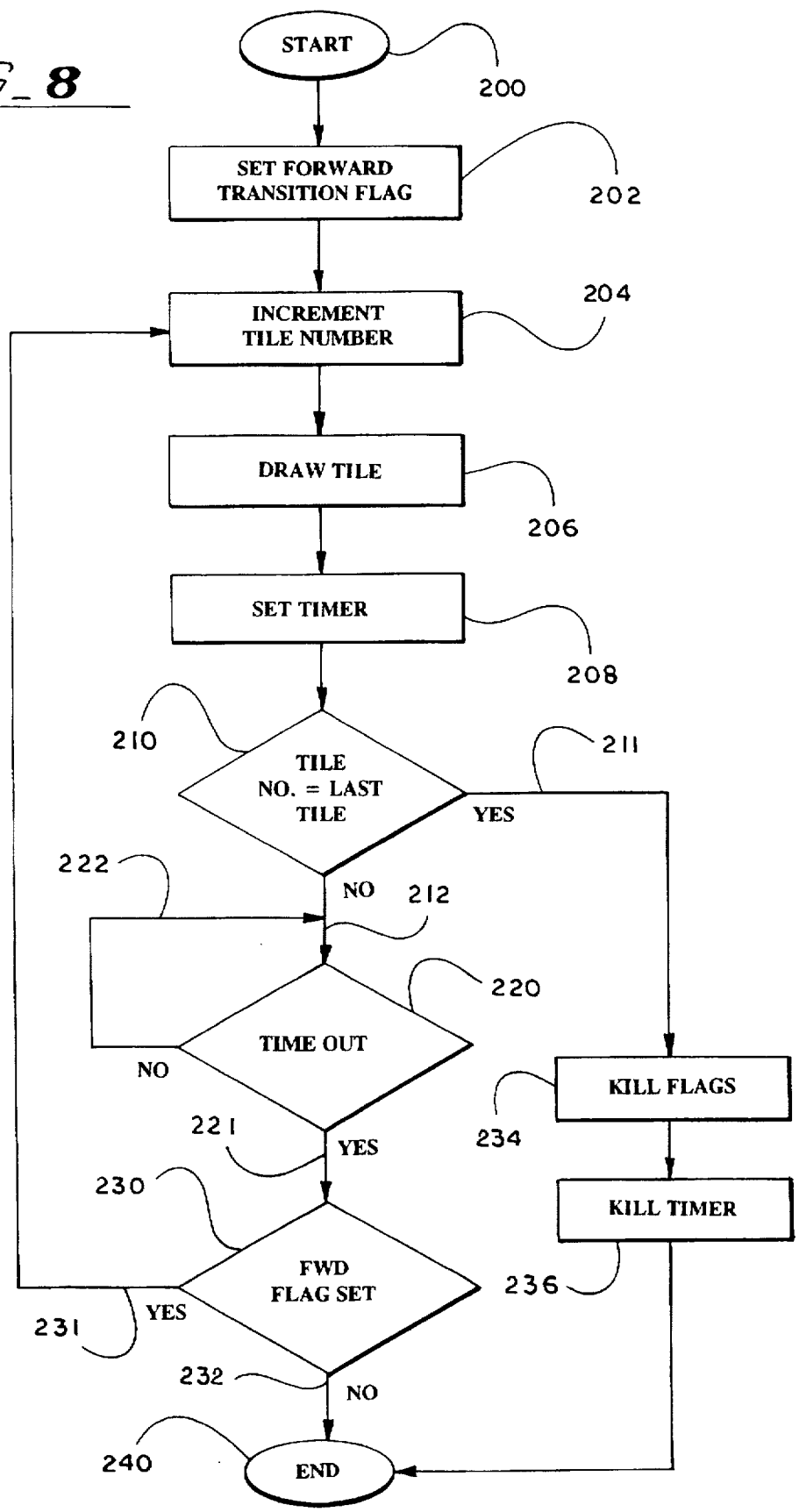
Fig_8

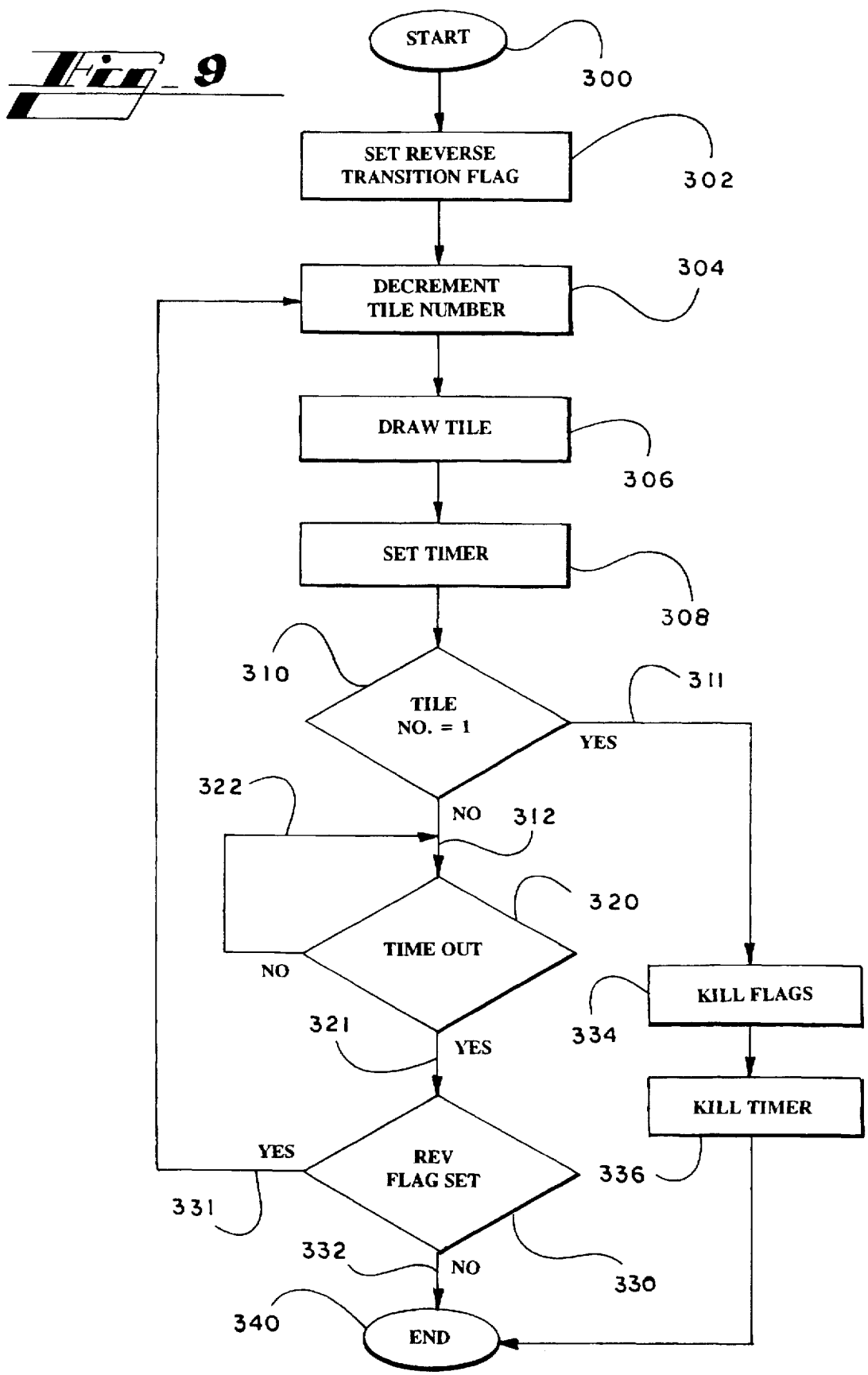

METHOD AND SYSTEM FOR DISPLAYING BUTTONS THAT TRANSITION FROM AN ACTIVE STATE TO AN INACTIVE STATE

TECHNICAL FIELD

The present invention relates generally to a method and system for displaying buttons on a display screen, and more specifically, to a method and system for displaying buttons that gradually transition from an active state to an inactive state.

BACKGROUND OF THE INVENTION

Computer operating systems frequently employ a graphical user interface to convey information to, and accept input from, the user of the computer. A graphical user interface is a type of display format that enables the user to choose commands, view lists of files, launch application programs, and invoke various functions associated with the application programs by activating control objects displayed on a display screen or other output device.

A graphical user interface operates as part of the operating system and provides an interface between the operating system and application programs or program modules running in conjunction with the operating system. An operating system that provides such a graphical user interface is the "WINDOWS" operating system manufactured and sold by Microsoft Corporation of Redmond, Wash., the assignee of the present invention.

A control object is an item displayed on the display screen that the user may select to initiate a function. Control objects can take many forms including buttons, icons, text, drop-down menus, dialog boxes, and toolbars. A control object may be displayed as a graphical representation of the function that the control object represents, thus aiding the user's recognition of the function of the control object.

The user interacts with a graphical user interface by selecting control objects. Generally, a control object is selected by using a mouse or any other suitable input device to position a cursor over the control object and then activating the input device, e.g., clicking a button on the mouse. When using a mouse, the cursor is positioned by a roller ball on the underside of the mouse, which generates directional commands as the mouse is moved by the user. The mouse movement is then translated by the operating system into movement of the cursor on the display screen.

The graphical interface includes several structures, including buttons, that are visually displayed to the user on the display screen. Buttons are particular portions on the display screen that represent user-selectable functions. The use of buttons is desirable in a computer system using a graphical user interface because the buttons representing functions are displayed on the screen and are thus visible to the user. Therefore, the user need only observe the screen to be aware of each of the functions available for the particular application in use. Also, buttons, which are activated by a simple click of the mouse, provide direct access to computer functions and thereby eliminate the need for the user to memorize a command to initiate the function associated with the button.

Buttons usually have defined borders within which is displayed a button identifier for informing the user of the function of the button or for otherwise identifying the button. The button identifier may be in the form of a graphical representation of the command, function, or action associated with the button. For example, a button that represents a "next page" function may include a graphical representation of an arrow. Another example is the use of a graphical representation of scissors on a button that commands the computer to perform the "cut" function of a "cut and paste" operation. Depending on the type of application program being used and the functions permitted by the respective application, different buttons are displayed on different parts of the screen.

However, a button need not be displayed as a graphical representation of the function with which it is associated. Buttons may also be displayed as numbers or as any other suitable identifiers to inform the user that the buttons provide some function related to the application program being run. For example, in the "EXPLORAPEDIA" application program, manufactured and sold by Microsoft Corporation of Redmond, Wash., a set of buttons is provided in association with predetermined frames displayed on the screen to visually inform the user that additional, related pages can be displayed by selecting the buttons. In the "EXPLORAPEDIA" application program, each button in the set is displayed as a number within a circle having a fanciful background pattern.

Buttons typically have two states: an active state and an inactive state. The button is displayed differently based on the state of the button. A button displayed in the active state is capable of being selected and is therefore displayed in a manner to inform the user that the button is active and the function associated with the button may be utilized. A button in the inactive state is not capable of being selected by the user and, therefore, the associated function is not available. A button in the inactive state is displayed such that it visually indicates to the user that the button cannot be activated.

The different states of a button are typically indicated by using color, shading, or any other suitable means to alter the appearance of the button. Often, a button in the active state is displayed in a different shade, color, or texture than a button in the inactive state. Also, a button in the active state may be displayed as being raised above the surface of the display screen and a button in the inactive state is displayed as being depressed below the surface of the screen.

There are several different types of buttons that can be displayed by the graphical user interface. Various types of buttons include push buttons, sticky buttons, and radio buttons. Push buttons resemble the raised-button look of a telephone keypad. Push buttons are displayed in the inactive state when the mouse or input device is clicked down on the button. Likewise, push buttons are displayed in the active state when the user releases the mouse button. Thus, a push button is similar to the buttons on a telephone keypad in that a push button does not remain in the inactive state after it is released by the user. By contrast, sticky buttons remain in the inactive state until the user again selects the button with the mouse or other input device. Radio buttons are a set of buttons representing related, alternatively-selectable functions. Thus, only one radio button may be selected at any one time. Therefore, each radio button is displayed in the inactive state until another radio button is selected, at which time the newly-selected button is displayed in its inactive state and the previously-selected button jumps back to its active state.

Because buttons are alternatively displayed in either the active state or the inactive state, there are only two possible displays for each button. When selected, a button typically changes from its active state to its inactive state instantaneously and the function associated with the button is immediately executed. The display of the button thus appears to change instantly from its active state to its inactive state with no delay or intervening displays when the button is selected. Similarly, the display of a button changing from its inactive state to its active state also appears to be instantaneous.

Interactive computer services and programs are becoming more prevalent, and therefore the need for providing a user interface that is not only easy to use but is fun and entertaining for the user is critical to the commercial success and acceptance of the computer services and programs. With computer systems today having increasingly elaborate graphics and audio capabilities, many possibilities exist for making computer programs more interesting and entertaining for the user.

Buttons displayed in connection with current computer programs change states instantaneously and thus do not provide an entertaining gradual transition from the active to the inactive state. Thus, a need exists for displaying buttons that gradually change from the active to the inactive state in a manner that is interesting and entertaining to the user.

SUMMARY OF THE INVENTION

The present invention provides a method and system for displaying a set of buttons on a display screen that gradually change from an active state to an inactive state. When a user selects a button displayed in its active state, such as by clicking a mouse, the system displays a sequence of transition frames at predetermined intervals, preferably 0.1 seconds. When the last transition frame in the sequence is displayed, indicating that the button is in the inactive state, the function associated with the button is executed.

Each transition frame may have unique audio accompaniment associated therewith. The audio associated with each transition frame may be played when the respective transition frame is drawn on the display screen.

Display of the transition frames begins when a mouse down event is detected when the cursor is positioned on the button. If a mouse up event is detected when the cursor is off the button, the transition frames are displayed in reverse order until the button is displayed in its active state.

A button returns to its active state from its inactive state when another button is subsequently selected. A button returning to its active state from its inactive state does not display transition frames in reverse order, but rather jumps directly to its active state display.

BRIEF DESCRIPTION OF THE DRAWINGS

FIG. 1 is a block diagram of a computer system on which the present invention is implemented.

FIG. 2 is a display screen showing an illustrative set of buttons each in its active state.

FIGS. 3A–F are display screens showing button 4 being changed from its active state to its inactive state in accordance with the present invention.

FIGS. 4A–F are display screens showing button 5 being changed from its active state to its inactive state in accordance with the present invention.

FIG. 5 shows the components of a button in accordance with the present invention.

FIG. 6 is a representation of the various transition frames of a button as stored in the computer in accordance with the present invention.

FIG. 7 is a flow chart generally describing the method of implementing the transition of buttons in accordance with the present invention.

FIG. 8 is a flow chart describing the computer-implemented steps of implementing the forward transition of a button in accordance with the present invention.

FIG. 9 is a flow chart describing the computer-implemented steps of implementing the reverse transition of a button in accordance with the present invention.

DETAILED DESCRIPTION OF THE PREFERRED EMBODIMENT

Turning next to the figures, the preferred embodiment will now be described in detail. The present invention is directed to a system for displaying buttons that transition from an active state to an inactive state in a manner that is entertaining to the user. Although the preferred embodiment of the present invention will be described with respect to a specific application program displayed to a user on a computer monitor, those skilled in the art will recognize that the present invention may be utilized in connection with other forms of communications media in which a graphical user interface displays user-selectable buttons on a display screen.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to convey most effectively teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

The preferred embodiment of the present invention is directed to a graphical user interface for a computer system that runs various application programs or program modules. This user interface, which is typically presented via an output device, such as a display or monitor, can include one or more control objects representing various control functions associated with the operation of the application program.

Although the preferred embodiment will be generally described in connection with a specific application program, those skilled in the art will recognize that the present invention also can be used in connection with any form of programming, including program modules such as application programs and operating systems, that utilize a graphical user interface to display control objects to the user.

Likewise, those skilled in the art will also appreciate that the present invention can be extended to communicating control information within the general purpose computing environment. Specifically, the present invention supports user interfaces for displaying buttons with general purpose computer systems, including desktop computers, portable computers, and hand-held computers.

Turning next to the figures, the preferred embodiment will now be described in detail. The method of the present invention is useful in connection with a graphical user interface that displays buttons on a display screen for visually informing the user of functions associated with the buttons.

As shown in FIG. 1, the preferred embodiment of the present invention is implemented on a computer system, generally shown at 10, having a central processing unit (CPU) 12, a memory 14 including an operating system 16 and an application program or program module 18, an input/output (I/O) controller 22, a display 24, and an input device 26. The application program 18 may be provided to the memory of the computer via a floppy disk drive or a CD-ROM drive 20. The input device 26 is preferably a mouse that allows the user to position a cursor on the display screen and select various control objects. It should be understood by those skilled in the art that any suitable input device may be used in place of a mouse, including a keyboard, a joystick, or a pen, stylus, or other pointing device for use on a touch screen display and that the terms "mouse", "mouse down" and "mouse up" as used herein should be understood to include all such input devices and selection operations that provide point and click control capability.

The user selects control objects on the display preferably by clicking a mouse. The clicking of the mouse involves two actions: a "mouse down" operation in which a button on the mouse is pushed to its down position and a "mouse up" operation in which the button on the mouse is released to its up position. For a control object to be selected, the user must perform both a mouse down and a mouse up operation with the cursor positioned over the desired control object.

The display 24 is preferably a computer monitor that includes a display screen for displaying images to the user, although any display that allows the user to observe and select control objects will be sufficient. The display 24 is coupled to the I/O controller 22 and is used to display images, data, and the like generated by the CPU 12 in accordance with the present invention. The display, as is known to those skilled in the art, is a generally rectangular array of picture elements, or pixels, extending across the entire width and height of the display screen.

In accordance with the present invention, the display 24 displays a screen including various data and graphical elements, as seen generally at 30 in FIG. 2. The screen 30 is a display generated in connection with the "EXPLORAPEDIA" application program, manufactured and sold by Microsoft Corporation, assignee of the present invention. The "EXPLORAPEDIA" application program is intended to provide information on a wide range of topics, similar to an encyclopedia, and is intended for use by children. Although the figures and accompanying description of the present invention is made with reference to displays associated with the "EXPLORAPEDIA" application program, it should be understood that the present invention is not limited in scope to any particular application program or program module. To the contrary, the present invention is envisioned to be useful and capable of being incorporated into any computer program in which user-selectable control objects, such as buttons, are provided by a graphical user interface.

In FIG. 2, screen 30 includes a window that displays information to the user. In this example, the information is displayed in a topic frame 32 that includes information on the general topic "Flowers and Herbs". A set of user-selectable control objects, generally shown at 40, are displayed as circular buttons to the right of the topic frame 32. The buttons are numbered 1 through 6, identified by reference numerals 41 through 46, respectively. Each button has a distinct appearance in that the background of each button is different. Additionally, each button may be displayed in different colors or shades for further differentiation.

Other control objects displayed on screen 30 include a "copy" button 50, a "print" button 52, a "find" button 54, a "go forward" button 56, a "see also" button 58, and an "off" button 60.

Each of the buttons 41–46 represents a function associated with the application program. For the "EXPLORAPEDIA" application program, each button 41–46 represents a function that displays a page of information related to the data displayed in the topic frame 32. For example, if the user activates button 1, a page containing data on pollination may be displayed. Button 2 may display a page containing information regarding a certain type of flower. Selecting other buttons will cause the computer to display other pages of related data associated with each respective button. Additional buttons may be displayed by activating the "go forward" button 56. The "EXPLORAPEDIA" application program supports up to 15 buttons for each topic frame.

The present invention relates to buttons that use visual and audio effects to simulate metamorphosis during transition from the active to inactive states. Transition from the active state to the inactive state is accomplished by displaying multiple transition frames preferably synchronized with audio effects. An example of the transition of buttons from the active to inactive states is shown in FIGS. 3 and 4.

FIGS. 3A–F show the set of buttons 40 as they would be displayed at various intervals after the selection of button 4. FIG. 3A shows button 3 in its inactive state 70 and shows the cursor 72, represented by the fly, positioned over button 4, which is displayed in its active state 74. In the example of FIG. 3, button 3 has been previously selected by the user. All other buttons are shown in their active states, and are thus capable of being selected by the user. When the user clicks the mouse button to select button 4, the selected button is displayed as a series of transition frames at predetermined time intervals until the button is displayed in its inactive state.

FIGS. 3A–F show button 4 displayed as six different transition frames, 74–79, between the active and inactive state. However, it should be understood that the number of frames displayed during the transition from the active to inactive state can be any number of frames displayed at any suitable time intervals, depending on the desired length and complexity of the transition.

After the user selects button 4, the transition frames are displayed at predetermined time intervals. For the buttons in the "EXPLORAPEDIA" application, the number of frames displayed during transition is preferably between 10 and 15 and the time interval between frames is 0.1 seconds. It should be understood that the number of frames and the time interval between frames can be varied to achieve any desired transition effect.

FIGS. 3A–F show the transition frames of button 4. The transition frames show the numeral "4" gradually sinking below the bottom border of the button. FIG. 3F shows the last transition frame, which corresponds to the button in its inactive state 79. In this example, button 4 in its inactive state is displayed as completely blacked out. When the display of FIG. 3F is displayed, the button is inactive and the function associated with the button is executed. In this case, the corresponding page of information associated with the button will be displayed in place of the topic frame 32.

Only one of the set of buttons can be activated at any one time. Therefore, FIG. 3F shows that when button 4 completes its transition to the inactive state 79, the previously-selected button, i.e., button 3, changes from its inactive state back to its active state. Button 3 remains in its inactive state 70 until button 4 completes its transition, at which time button 3 jumps back to its active state 80. In the "EXPLORAPEDIA" application program, the previously-selected button does not transition backwards, but jumps directly from its inactive state to its active state. This is seen in FIGS. 3E–F, where button 3 remains in its inactive state 70 until button 4 completes its transition to its inactive state 79. At this time, the display of button 3 jumps directly from its inactive state 70 to its active state 80 with no intervening transition. However, the present invention should not be construed to be limited to gradual transition only from active to inactive states, and gradual transition from an inactive state back to an active state should be considered to be within the scope of the invention.

FIGS. 4A–F show the display of the set of buttons 40 when the user subsequently selects button 5. When the user selects button 5, identified in its active state at 82, the sequence of transition frames 82–87 shows the numeral "5" slowly dissolving into a swirl. Also, button 4 remains in its inactive state 79 until button 5 reaches its inactive state 87. When the transition of button 5 is complete such that button 5 is displayed in its inactive state 87, button 4 returns immediately to its active state 74. In this manner, the set of buttons 40 are similar to radio buttons in that only one button may be activated at any one time. When a button is activated, it remains in its inactive state until another button is subsequently activated. When the subsequently-activated button changes to its inactive state, the previously-selected button returns to its active state.

The sequence of displayed transition frames may also be accompanied by audio. In a manner similar to the visual display of transition frames, audio is preferably played at the predetermined time intervals associated with the visual transition frames. However, the audio need not be played at the predetermined time intervals, but may be played in a continuous manner throughout, or even continuing after, the transition of the button.

The display of each button, the transition frames associated with each button, and the accompanying audio associated with each button are preferably distinct from that of all other buttons. The buttons may utilize different colors, shading, textures, or any other visual effects to differentiate the visual display of each button not only in the active and inactive states, but also during transition. Thus, each button has its own individual appearance and transitional sequence, thus adding to the entertainment effect of the buttons.

Each button is displayed on the display screen as a circular control object. However, as shown in FIG. 5, each button includes a rectangular region 94 within which is a circular region 96 that defines the button. FIG. 5 is an example of display screen 30. Within the screen is a window 90 which includes a topic frame 32 and a set of buttons. For convenience, only one enlarged button 92 of the set has been shown.

Each button 92 includes a rectangular region 94 within which is a circular region 96. It is this circular region in which the button is displayed. The area of the rectangular region outside the circular region is given a transparent color. Thus, the portion of the window 90 behind the rectangular region is displayed through the transparent color of the rectangular region. The display of the button, stored as a bitmap defining each pixel, is placed in that portion of the rectangular region that is not transparent, i.e., the circular region 94. In such a manner, a rectangular button is displayed as a circular button, in accordance with the preferred embodiment of the present invention.

The button is selected when the user positions a cursor over the circular region 96. If the user positions the cursor over the part of the rectangular region outside the circular region, e.g., location 95, and clicks the mouse, the button is not selected. Rather, a mouse down message is passed to the window 90 behind the rectangular region and the function associated with that portion of the window, if any, is executed. For button 92 to be selected, the user must position the cursor within the circular region 96 and click the mouse.

The transition frames of the transition sequence are stored in the memory of the computer and are preferably stored continuously, as shown in FIG. 6. Each bitmap contains a number of tiles that each store the display for one transition frame. Each tile has a unique identification number and includes information regarding the display of each pixel of the circular region of the button. Thus, each transition frame is represented by a tile number within one bitmap that stores all transition frames for that button. Therefore, when the transition of a button is initiated, the location and display information of each transition frame is stored at a single location and is quickly accessible. Again, it should be understood that any number of transition frames may be provided for any button and that no absolute minimum or maximum number of transition frames is required for a complete transition of a button from an active to an inactive state.

Similarly, the audio associated with each transition frame may be stored with unique identifying numbers such that the audio can be retrieved and played when its associated transition frame is displayed. Preferably, the audio associated with each transition frame is unique and distinct from the audio associated with all other transition frames.

A flow chart describing the method of initiating the transition of buttons is shown in FIG. 7. The method begins at 100. At step 110, the system determines whether the mouse button has been clicked to its down position with the cursor positioned over the button. If the mouse has been clicked to its down position but the cursor is not located over the button, the method follows "no" branch 112 to step 115, where a mouse down message is sent to the window behind the button. The method then terminates at 160. If the mouse has been clicked down with the cursor over the button, the method follows "yes" branch 111 to step 120.

At step 120, the transition from the button's active state to its inactive state is begun. The transition from active to inactive states is called "forward transition". Similarly, any transition returning a button to its active state is called "reverse transition". Therefore, the forward transition of a button begins when the mouse is clicked down when the cursor is on the button and does not wait for the mouse to be released to its up position.

At step 130, it is determined whether the button on the mouse has been released to its up position, thus completing the user's selection. If the mouse is not in the up position, the method follows "no" branch 132 to step 135, where the forward transition is continued until a mouse up event is detected. If the mouse is in the up position, the method follows "yes" branch 131 to step 140.

At step 140, it is determined whether the mouse has been released to its up position while the cursor is positioned over the button on the display screen. If the mouse up event occurs with the cursor on the button, meaning the user has selected the button, the method follows "yes" branch 141 to step 150. At step 150, the forward transition continues until it is completed. Once the forward transition is completed, i.e., the button is displayed in its inactive state, the method follows "yes" branch 151 to step 155.

At step 155, the function associated with the button is executed. In the Explorapedia application program, the function is the display of a page of information related to the topic frame with which the button is associated. The method then terminates at 160.

At step 140, if the mouse has been released to its up position when the cursor is not positioned on the button, the method follows "no" branch 142 to step 158. At step 158, reverse transition is begun. This occurs when the user has initially clicked the mouse down but has dragged the cursor off of the button prior to releasing the mouse to its up position. This means that the user has not selected the button. During reverse transition, the sequence of transition frames displayed during forward transition are displayed in reverse order until the button is displayed in its active state.

It should be understood that reverse transition as described herein relates to returning a button its active state when it was not properly selected by the user. This is different than a properly selected button returning from its inactive state to its active state as described in FIGS. 3 and 4.

The method by which forward transition is accomplished is described in FIG. 8. The method begins at 200. When forward transition is initiated due to a mouse down event when the cursor is over a button, a forward transition flag is set, at step 202.

At step 204, the tile number that represents the transition frame to be displayed is incremented by one. The display of a button in its active state is considered the first transition frame of the transition sequence. Therefore, by incrementing the tile number by one tile, the next frame in the transition sequence is obtained.

At step 206, the next tile is retrieved, and the corresponding transition frame is drawn on the display screen. In conjunction with step 206, any audio associated with the transition frame is retrieved and is played at the time the transition frame is drawn on the screen.

At step 208, a timer is set, preferably 0.1 seconds. The timer is used to establish the interval between the display of transition frames. It has been determined that displaying transition frames at 0.1 second intervals is beneficial in that the transition can be viewed by the user yet is completed in a relatively short time so as to not undesirably delay or frustrate the user.

After the timer is set, it is determined at step 210 whether the tile drawn at step 206 was the last tile in the transition sequence, i.e., whether the corresponding transition frame displays the button in its inactive state. If the tile was the last tile, the method follows "yes" branch 211 to steps 234 and 236, where the forward transition flag and the timer are cleared, respectively. The method then terminates at 240.

If the tile drawn at step 206 was not the last tile of the transition sequence, the method follows "no" branch 212 to step 220. At step 220, it is determined whether the timer has timed out. If not, the method follows "no" branch 222 to return to step 220. In this manner, the method will not proceed until the timer times out. When the timer times out, the method follows "yes" branch 221 to step 230.

At step 230, the system checks to ensure that the forward transition flag is still set. If the flag is not set, as would occur if the user dragged the cursor off the button prior to releasing the mouse button to its up position, the method follows "no" branch 232 and the method of forward transition terminates at 240. If the forward transition flag remains set, the method follows "yes" branch 231 and returns to step 204 to again increment the tile number to display the next transition frame.

The method by which reverse transition occurs is described in FIG. 9. Reverse transition is initiated after forward transition has begun and when a mouse up event occurs when the cursor is positioned off of the button. The method begins at 300. When reverse transition is begun, a reverse transition flag is set, at step 302.

At step 304, the tile number that represents the transition frame to be displayed is decremented by one. Decrementing the tile number of the transition frames causes the system to reverse the sequence of frames displayed as part of the forward transition. Therefore, by decrementing the tile number by one tile, the previous transition frame in the transition sequence is obtained.

At step 306, the previously-displayed tile is retrieved and the corresponding transition frame is drawn on the display screen. In conjunction with step 306, any audio associated with the transition frame is retrieved and is played at the time the transition frame is drawn on the screen.

At step 308, a timer is set. Preferably, the timer is set to 0.1 seconds. The timer is used to time the display of successive transition frames. After the timer is set, it is determined at step 310 whether the tile drawn at step 306 was the first tile in the transition sequence, i.e., whether the corresponding transition frame shows the button in its active state. If the tile drawn was the first tile, the method follows "yes" branch 311 to step 334 where the reverse transition flag is cleared. At step 336, the timer is cleared and the method then terminates at 340.

If the tile drawn at step 306 was not the first tile of the transition sequence, the method follows "no" branch 312 to step 320. At step 320, it is determined whether the timer has timed out. If not, the method follows "no" branch 322 to return to step 320. In this manner, the method will not proceed until the timer times out. When the timer times out, the method follows "yes" branch 321 to step 330.

At step 330, the system checks to ensure that the reverse transition flag is set. If the flag is not set, as would occur when the user properly selected the button, the method follows "no" branch 332 and the method of reverse transition terminates at 340. If the reverse transition flag remains set, the method follows "yes" branch 331 and returns to step 304 to again decrement the tile number to display the next previous transition frame.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A method for displaying a button on a display screen of a computer system, said method comprising the steps of:
    displaying a button in its active state to visually indicate that the button is selectable; selecting the button by a user of the computer system;
    activating the button by the user:
    in response to activating the button, displaying a sequence of transition frames associated with the button;
    displaying the button in its inactive state at the end of the sequence of transition frames to visually indicate that the button is not selectable;
    executing the function associated with the button;
    deactivating the button:
    in response to deactivating the button, displaying the sequence of transition frames associated with the button in reverse order; and
    displaying the button in its active state at the end of the reverse sequence of transition frames to visually indicate that the button is again selectable.

2. The method of claim 1 wherein the sequence of transition frames has audio associated therewith.

3. The method of claim 1 wherein each transition frame has unique audio associated therewith.

4. The method of claim 1 wherein the computer system includes a cursor and a mouse for positioning the cursor on the display screen, wherein said step of activating the button begins when the user performs a mouse down operation with the cursor over the button.

5. The method of claim 4 wherein said step of initiating the function associated with the button is performed after the user performs a mouse up operation with the cursor positioned over the button.

6. The method of claim 4, wherein the deactivation step includes the user performing a mouse up operation with the cursor positioned off of the button.

7. The method of claim 1 wherein each transition frame in the sequence of transition frames is displayed at approximately 0.1 second intervals.

8. The method of claim 1 wherein the sequence of transition frames includes between approximately 10-15 frames.

9. The method of claim 1 wherein the sequence of transition frames is stored as a single bitmap in a continuous block of memory in the computer.

10. The method of claim 9 wherein each transition frame of the sequence of transition frames is stored as a tile within the bitmap, with each tile having an identification number corresponding to the frame's position in the sequence of transition frames.

11. The method of claim 2 wherein the audio associated with each sequence of transition frames is stored in a continuous block of memory in the computer.

12. A method for displaying a plurality of buttons on a display screen of a computer system, said method comprising the steps of:
    displaying each of the buttons in its respective active state to visually indicate that each button is selectable;
    selecting a first button by a user of the computer system;
    activating the first button;
    displaying a sequence of transition frames associated with the first button in response to the activation of the first button;
    at the end of the sequence of transition frames associated with the first button:
        displaying the first button in its inactive state to visually indicate that the first button is not selectable; and
        executing the function associated with the first button;
    selecting a second button by the user of the computer system;
    activating the second button;
    displaying a sequence of transition frames associated with the second button in response to the activation of the second button; and
    at the end of the sequence of transition frames associated with the second button:
        displaying the second button in its inactive state to visually indicate that the second button is not selectable;
        displaying the first button in its active state; and
        executing the function associated with the second button.

13. The method of claim 12, wherein said step of displaying the second button in its inactive state and said step of displaying the first button in its active state are performed simultaneously such that only one of the plurality of buttons is displayed in its inactive state at one time.

14. The method of claim 12 wherein said step of displaying the first button in its inactive state is accomplished without a sequence of transition frames.

15. The method of claim 12, wherein each sequence of transition frames is different for each button.

16. The method of claim 12, wherein each sequence of transition frames has audio associated therewith.

17. The method of claim 16 wherein each transition frame has unique audio associated therewith.

18. The method of claim 12, wherein the computer system includes a cursor and a mouse for positioning the cursor on the display screen, wherein said step of displaying a sequence of transition frames begins when the user performs a mouse down operation with the cursor over the button.

19. The method of claim 18 wherein said step of executing the function associated with the button is performed when the user performs a mouse up operation with the cursor positioned over the button.

20. The method of claim 18 further comprising displaying the sequence of transition frames in reverse order when the user performs a mouse up operation with the cursor positioned off of the button.

21. The method of claim 12, wherein each transition frame in each sequence of transition frames is displayed at approximately 0.1 second intervals.

22. The method of claim 12, wherein the sequence of transition frames includes between approximately 10–15 frames.

23. The method of claim 12, wherein each sequence of transition frames is stored as a single bitmap in a continuous block of memory in the computer.

24. The method of claim 23 wherein each transition frame of each sequence of transition frames is stored as a tile within the bitmap, with each tile having an identification number corresponding to the frame's position in the sequence of transition frames.

25. The method of claim 16 wherein the audio associated with each sequence of transition frames is stored in a continuous block of memory in the computer.

26. A system for displaying a button on a display screen of a computer system, comprising:
  means for displaying a button in its active state to visually indicate that said button is selectable;
  means for selecting said button by a user of said computer system;
  means for activating the button by the user;
  means responsive to said activation means for displaying a sequence of transition frames associated with said button;
  means for displaying said button in its inactive state at the end of said sequence of transition frames to visually indicate that said button is not selectable;
  means for executing the function associated with said button;
  means for deactivating the button;
  means responsive to the deactivation of the button for displaying the sequence of transition frames associated with the button in reverse order; and
  means for displaying the button in its active state at the end of the reverse sequence of transition frames to visually indicate that the button is again selectable.

27. The system of claim 26 wherein said sequence of transition frames has audio associated therewith.

28. The system of claim 27 wherein each transition frame of said sequence of transition frames has unique audio associated therewith.

29. The system of claim 26 wherein said computer system includes a cursor and a mouse for positioning the cursor on the display screen, wherein said means for activating the button includes the user performing a mouse down operation with said cursor over said button.

30. The system of claim 29 wherein said means for executing the function associated with said button includes the user performing a mouse up operation with said cursor positioned over said button.

31. The system of claim 29 wherein the deactivation means includes the user performing a mouse up operation with said cursor positioned off of said button.

32. The system of claim 26 wherein said means for displaying a sequence of transition frames displays each said transition frame at approximately 0.1 second intervals.

33. The system of claim 26 wherein said sequence of transition frames includes between approximately 10–15 frames.

34. The system of claim 26 wherein said sequence of transition frames is stored as a single bitmap in a continuous block of memory in the computer.

35. The system of claim 34 wherein each transition frame of said sequence of transition frames is stored as a tile within the bitmap, with each tile having an identification number corresponding to the frame's position in the sequence of transition frames.

36. The system of claim 27 wherein the audio associated with the sequence of transition frames is stored in a continuous block of memory in the computer.

37. A system for displaying a plurality of buttons on a display screen of a computer system comprising:
  means for displaying each of said buttons in its respective active state to visually indicate that each said button is selectable;
  means for selecting a first button by a user of said computer system;
  means for activating the first button;
  means responsive to the activation of the first button for displaying a sequence of transition frames associated with said first button;
  means for displaying said first button in its inactive state at the end of said sequence of transition frames to visually indicate that said first button is not selectable;
  means for executing the function associated with said first button;
  means for selecting a second button by the user of said computer system;
  means for activating the second button;
  means responsive to the activation of the second button for displaying a sequence of transition frames associated with the second button; and
  at the end of said sequence of transition frames associated with said second button:
    means for displaying said second button in its inactive state to visually indicate that said second button is not selectable;
    means for displaying said first button in its active state; and
  means for executing the function associated with said second button.

38. The system of claim 37, wherein said means for displaying said second button in its inactive state and said means for displaying said first button in its active state displays said buttons simultaneously such that only one of the plurality of buttons is displayed in its inactive state at one time.

39. The system of claim 37, wherein said means for displaying said first button in its inactive state displays said first button without a sequence of transition frames.

40. The system of claim 37, wherein each sequence of transition frames is different for each button.

41. The system of claim 37 wherein the sequence of transition frames has audio associated therewith.

42. The system of claim 41 wherein each transition frame has unique audio associated therewith.

43. The system of claim 37 wherein said computer system includes a cursor and a mouse for positioning the cursor on the display screen, wherein said means for activating said first button includes the user performing a mouse down operation with said cursor over said first button.

44. The system of claim 43 wherein said means for executing the function associated with said first button executes said function after the user performs a mouse up operation with said cursor positioned over said first button.

45. The system of claim 43 further comprising means for displaying said sequence of transition frames in reverse order when the user performs a mouse up operation with said cursor positioned off of said first button.

46. The system of claim 37 wherein said means for displaying a sequence of transition frames displays each said transition frame at approximately 0.1 second intervals.

47. The system of claim 37 wherein said sequence of transition frames includes between approximately 10–15 frames.

48. The system of claim 37 wherein said sequence of transition frames is stored as a single bitmap in a continuous block of memory in the computer.

49. The system of claim 48 wherein each transition frame of said sequence of transition frames is stored as a tile within the bitmap, with each tile having an identification number corresponding to the frame's position in the sequence of transition frames.

50. The system of claim 41 wherein the audio associated with the sequence of transition frames is stored in a continuous block of memory in the computer.

51. A computer-readable medium on which is stored a computer program for displaying a button on a display screen of a computer system, the computer program comprising instructions which, when executed by the computer, perform the steps of:
   displaying a button in its active state to visually indicate that the button is selectable;
   selecting the button by a user of the computer system;
   activating the button by the user;
   in response to activating the button, displaying a sequence of transition frames associated with the button;
   displaying the button in its inactive state at the end of the sequence of transition frames to visually indicate that the button is not selectable;
   executing the function associated with the button
   deactivating the button;
   in response to deactivating the button, displaying the sequence of transition frames associated with the button in reverse order; and
   displaying the button in its active state at the end of the reverse sequence of transition frames to visually indicate that the button is again selectable.

52. The computer-readable medium of claim 51, wherein the sequence of transition frames has audio associated therewith.

53. The computer-readable medium of claim 51, wherein each transition frame has unique audio associated therewith.

54. The computer-readable medium of claim 51, wherein the computer system includes a cursor and a mouse for positioning the cursor on the display screen, wherein said step of activating the button begins when the user performs a mouse down operation with the cursor over the button.

55. The computer-readable medium of claim 54, wherein said step of initiating the function associated with the button is performed after the user performs a mouse up operation with the cursor positioned over the button.

56. The computer-readable medium of claim 51, wherein the deactivation step includes the user performing a mouse up operation with the cursor positioned off of the button.

57. The computer-readable medium of claim 51, wherein each transition frame in the sequence of transition frames is displayed at approximately 0.1 second intervals.

58. The computer-readable medium of claim 51, wherein the sequence of transition frames includes between approximately 10–15 frames.

59. The computer-readable medium of claim 51, wherein the sequence of transition frames is stored as a single bitmap in a continuous block of memory in the computer.

60. The computer-readable medium of claim 59, wherein each transition frame of the sequence of transition frames is stored as a tile within the bitmap, with each tile having an identification number corresponding to the frame's position in the sequence of transition frames.

61. The computer-readable medium of claim 52, wherein the audio associated with each sequence of transition frames is stored in a continuous block of memory in the computer.

62. A computer-readable medium on which is stored a computer program for displaying a button on a display screen of a computer system, the computer program comprising instructions which, when executed by the computer, perform the steps of:
   displaying each of the buttons in its respective active state to visually indicate that each button is selectable;
   selecting a first button by a user of the computer system;
   activating the first button;
   displaying a sequence of transition frames associated with the first button in response to the activation of the first button;
   at the end of the sequence of transition frames associated with the first button:
      displaying the first button in its inactive state to visually indicate that the first button is not selectable; and
      executing the function associated with the first button
   selecting a second button by the user of the computer system;
   activating the second button;
   displaying a sequence of transition frames associated with the second button in response to the activation of the second button;
   at the end of the sequence of transition frames associated with the second button:
      displaying the second button in its inactive state to visually indicate that the second button is not selectable;
      displaying the first button in its active state; and
      executing the function associated with the second button.

63. The computer-readable medium of claim 62, wherein said step of displaying the second button in its inactive state and said step of displaying the first button in its active state are performed simultaneously such that only one of the plurality of buttons is displayed in its inactive state at one time.

64. The computer-readable medium of claim 62, wherein said step of displaying the first button in its inactive state is accomplished without a sequence of transition frames.

65. The computer-readable medium of claim 62, wherein each sequence of transition frames is different for each button.

66. The computer-readable medium of claim 62, wherein each sequence of transition frames has audio associated therewith.

67. The computer-readable medium of claim 66, wherein each transition frame has unique audio associated therewith.

68. The computer-readable medium of claim 62, wherein the computer system includes a cursor and a mouse for positioning the cursor on the display screen, wherein said step of displaying a sequence of transition frames begins when the user performs a mouse down operation with the cursor over the button.

69. The computer-readable medium of claim 68, wherein said step of executing the function associated with the button is performed when the user performs a mouse up operation with the cursor positioned over the button.

70. The computer-readable medium of claim 68, further comprising displaying the sequence of transition frames in reverse order when the user performs a mouse up operation with the cursor positioned off of the button.

71. The computer-readable medium of claim 62, wherein each transition frame in each sequence of transition frames is displayed at approximately 0.1 second intervals.

72. The computer-readable medium of claim 62, wherein the sequence of transition frames includes between approximately 10–15 frames.

73. The computer-readable medium of claim 62, wherein each sequence of transition frames is stored as a single bitmap in a continuous block of memory in the computer.

74. The computer-readable medium of claim 73, wherein each transition frame of each sequence of transition frames is stored as a tile within the bitmap, with each tile having an identification number corresponding to the frame's position in the sequence of transition frames.

75. The computer-readable medium of claim 66, wherein the audio associated with each sequence of transition frames is stored in a continuous block of memory in the computer.

* * * * *